US011068512B2

(12) United States Patent
Tung et al.

(10) Patent No.: US 11,068,512 B2
(45) Date of Patent: Jul. 20, 2021

(54) DATA VIRTUALIZATION USING LEVERAGED SEMANTIC KNOWLEDGE IN A KNOWLEDGE GRAPH

(71) Applicant: Accenture Global Solutions Limited, Dublin (IE)

(72) Inventors: Teresa Sheausan Tung, San Jose, CA (US); Colin Anil Puri, San Jose, CA (US); Zhijie Wang, Fremont, CA (US); Matthew Bernard Kujawinski, San Francisco, CA (US)

(73) Assignee: Accenture Global Solutions Limited, Dublin (IE)

(*) Notice: Subject to any disclaimer, the term of this patent is extended or adjusted under 35 U.S.C. 154(b) by 139 days.

(21) Appl. No.: 16/393,296

(22) Filed: Apr. 24, 2019

(65) Prior Publication Data
US 2020/0034375 A1    Jan. 30, 2020

Related U.S. Application Data

(63) Continuation of application No. 16/047,573, filed on Jul. 27, 2018, now Pat. No. 10,296,524.

(51) Int. Cl.
*G06F 16/28* (2019.01)
*G06F 16/2453* (2019.01)
*G06F 16/21* (2019.01)
*G06F 16/248* (2019.01)
*G06F 40/295* (2020.01)
*G06N 5/02* (2006.01)
*G06N 7/00* (2006.01)

(52) U.S. Cl.
CPC .......... *G06F 16/288* (2019.01); *G06F 16/211* (2019.01); *G06F 16/248* (2019.01); *G06F 16/24542* (2019.01); *G06F 40/295* (2020.01); *G06N 5/02* (2013.01); *G06N 7/005* (2013.01)

(58) Field of Classification Search
CPC ............. G06F 16/288; G06F 16/24542; G06F 16/211; G06F 16/248; G06F 40/295; G06N 5/02; G06N 7/005
USPC ........................................................ 707/713
See application file for complete search history.

(56) References Cited

U.S. PATENT DOCUMENTS

| 7,984,043 B1 | 7/2011 | Waas | |
| 2008/0071748 A1* | 3/2008 | Wroblewski | G06F 16/2282 |
| 2008/0147627 A1 | 6/2008 | Natkovich et al. | |
| 2008/0183688 A1 | 7/2008 | Chamdani et al. | |
| 2012/0246153 A1 | 9/2012 | Pehle | |
| 2012/0310916 A1* | 12/2012 | Abadi | G06F 16/24542 |
| | | | 707/713 |

(Continued)

OTHER PUBLICATIONS

Office Action in Europe Application No. 19176383.8, dated Feb. 23, 2021, 12 pages.

(Continued)

*Primary Examiner* — Evan Aspinwall
(74) *Attorney, Agent, or Firm* — Brinks Gilson & Lione

(57) ABSTRACT

A knowledge graph virtualization system (KGVS) implements data virtualization techniques using semantic knowledge when parsing a knowledge graph to return results to a query. The data virtualization using semantic knowledge enable end users and applications to describe desired output without detailed knowledge of underlying data storage, schema, and relationships.

20 Claims, 5 Drawing Sheets

(56) References Cited

U.S. PATENT DOCUMENTS

2014/0280307 A1* 9/2014 Gupta .................. G06N 5/025
707/769

OTHER PUBLICATIONS

Extended European Search Report in Europe Application No. 19176383.8, dated Aug. 9, 2019, 7 pages.
Chen et al., "Knowledge expansion over probabilistic knowledge bases", Proceedings of the 2014 ACM SIGMOD international conference on Management of data, SIGMOD '14, Jan. 1, 2014, pp. 649-660, XP055609631, New York, USA, 12 pages.
Wikipedia, 103.255.5.60: "Query optimization", May 21, 2018, XP055769707, Retrieved from the Internet at URL: <https://en.wikipedia.org/w/index.php?title=Query_optimization&oldid=842282925>, retrieved on Jan. 28, 2021, 4 pages.

* cited by examiner

DATA VIRTUALIZATION USING LEVERAGED SEMANTIC KNOWLEDGE IN A KNOWLEDGE GRAPH

CROSS-REFERENCE TO RELATED APPLICATION(S)

This application is a continuation of U.S. patent application Ser. No. 16/047,573, filed on Jul. 27, 2018, the entirety of which is hereby incorporated by reference herein.

TECHNICAL FIELD

This disclosure relates to complex computer system architectures for applying data virtualization using leveraged semantic knowledge in a knowledge graph. By utilizing such knowledge graphs to return results to query inputs, improvements to computer capabilities are achieved that reduce the expenditure of computing resources when compared to other knowledge graphs.

BACKGROUND

Data may be stored in different data stores depending on factors including data structure, volatility, volume, or other measurable attribute. These data stores may be designed, managed, and operated by different units within an enterprise organization. It follows that such data stores in practice behave as data silos which are disparate, isolated, and make data less accessible across the units. More transparent and open data storage solutions are desired by enterprise organizations to more efficiently and effectively share and access its information amongst their different units.

DETAILED DESCRIPTION

Figure 1:
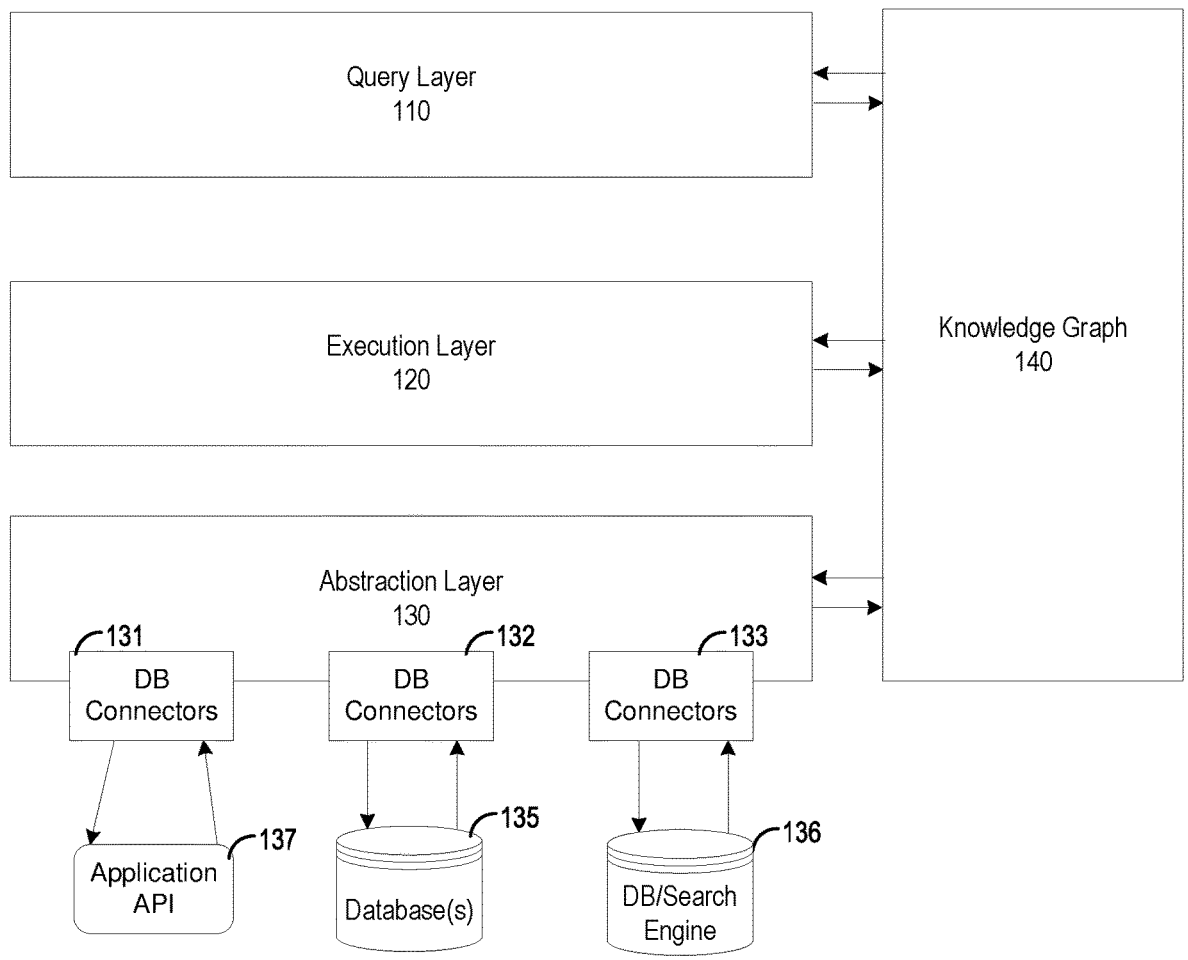
FIG. 1 shows an exemplary block diagram of a knowledge graph virtualization system.

In order to take advantage of the benefits offered by big data technologies, enterprise systems have access to large, and rapidly growing, volumes of information, both proprietary and public. Existing analytical applications and data warehousing systems have not been able to fully utilize this profound access to information. Often times information is simply aggregated into large data lakes or data warehouses without the inclusion of an added layer of relationship data connecting the information. Such aggregation of large amounts of data without contextual or relational information are data dumps that are not particularly useful. Information stored in data lakes and data warehouses are likely to be stored in their original format, thus expending large amounts of computing resources to extract, transform, and load (ETL) the information into a searchable data set to respond to a data query.

To address these technical problems, a knowledge graph is disclosed that offers an innovative data structure that presents relevant information in response to a data query, as well as relationship information between the relevant information. The knowledge graph includes a knowledge base of relevant information that is structured in a graph presentation that captures entities (i.e., nodes), relationships (i.e., edges), and attributes (i.e., node properties or edge properties) with semantic meaning. This graph data structure model offered by the knowledge graph provides the semantic meaning of the included data, by modeling data with an ontology or taxonomy. Accordingly, technical improvements are realized when a computing device structures information into knowledge graphs and runs search queries on the knowledge graphs, which specifically result in the retrieval of more relevant and accurate information, in a shorter amount of time.

Constructing a knowledge graph may include two steps. First, a graph schema definition is obtained for the knowledge graph and refinement is applied as the knowledge graph is being generated. This defines the types of vertices and edges that are generated into the knowledge graph. Second, the knowledge graph is hydrated with information by ingesting knowledge from multiple data sources and different knowledge extraction techniques (e.g., natural language processing (NLP), schema mapping, computer visions, or the like) to create the vertices and edges in the knowledge graph. Each data source may create its own data processing pipeline for extracting data to include into the knowledge graph being constructed.

Even with the described advantages of the knowledge graphs, constructing the knowledge graph representation of existing data can be costly, due to complex schema, re-ingesting data, data duplication, as well as other technical requirements. Therefore, to further improve the knowledge graphs, data virtualization techniques are applied to construct virtual knowledge graphs that aim to take advantage of existing data and graph querying systems, such as direct translation from SPARQL queries to SQL queries, to reduce the cost of knowledge graph construction. Data virtualization systems decouple application logic from any specific storage system mechanism (e.g., query language, query language versions) and abstract several different data storage systems as one. It follows that data virtualization allows an application to retrieve and manipulate data without requiring technical details about the data, such as how it is formatted at its source data storage system, or where the data is physically located.

Knowledge graphs and data virtualization systems enable the presentation of data across heterogeneous environment for end users to consume. In this disclosure, heterogeneous systems may refer to different types of storage mechanisms, data source query languages, database application versions, different vendors, or other measurable differences. Applications, systems, or human users typically bear the cognitive workload of query generation and query planning. These require knowledge of the physical schema of original data storage systems and their interconnections, such as different logical relationships between different schema elements, as well as any other attributes (e.g., query language version/specification, i.e. ANSI SQL, T-SQL, SQL99). Data virtualization and virtual knowledge graphs may require manual effort to maintain the virtual data model and virtual schema in response to schema changes of the underlying data source. Otherwise, explicit schema correlation logic is encoded in input queries. Other solutions, such as a semantic data lake or a data warehouse, utilize duplicate data storage (one copy of data in an original system and one copy of data in a data lake/warehouse), which results in data synchronization problems and requires domain experts to codify human knowledge of schema and data into data processing procedures. Additionally, this requires updating the data processing logic for any changes in the schema.

Therefore, to fully utilize the technical benefits and improvements offered by data virtualization of data sources for constructing knowledge graphs, this disclosure describes applying data virtualization techniques in a knowledge graph by using leveraged semantic knowledge. By using the leveraged semantic knowledge with the data virtualization, data in the knowledge graph remains fresh. Further, data access control is maintained by the source system, thus improving security. Further, the computer capabilities of the computer architecture are improved as there is no added delay or wasted computing resources to duplicate data, which is required in other systems that do not use the leveraged semantic knowledge with data virtualization in knowledge graphs.

FIG. 1 shows an exemplary block diagram representing a high level illustration of components that comprise a knowledge graph virtualization system (KGVS) 100. The KGVS 100 includes a query layer 110, an execution layer 120, and an abstraction layer 130. Each of the query layer 110, execution layer 120, and the abstraction layer 130, engage in bi-directional communication of information with a knowledge graph 140, to write new data into the knowledge graph 140, as well as parse the knowledge graph 140 for information to answer data queries received by the KGVS 100.

In addition, the abstraction layer 130 communicates with an application programming interface (application API) through a first set of database (DB) connector 131. The abstraction layer 130 further communicates with a data source database 135 through a second set of DB connectors 132, and communicates with a DB/Search engine 136 through a third set of DB connector 133.

The query layer 110 is comprised of software, hardware, APIs, and/or circuitry for implementing the attributed features of the query layer 110 described herein. The query layer 110 is configured to receive a query from a user or other enterprise unit, and initiate initial planning steps for obtaining information from the knowledge graph 140 to answer the query. The query layer 110 implements an abstract representation of the query language, which translates a directed acyclic graph of sub query tasks, expressed in the form of enterprise business entities from the associated business ontology. The query interpretation mechanism parses an input query into generic data transformation steps. It also reasons the data transformation plan against the knowledge graph, in order to infer missing query logic and ontology elements. For example, the query layer 110 may receive the following exemplary query from an enterprise unit, where the enterprise unit may be a user interfaced enterprise application that is part of a financial services enterprise: "Show me customers from state of California with balance greater than $20,000". This exemplary query will be referenced throughout this disclosure.

The initial planning steps may include interpreting the received query to extract schema elements, relationships, processing logic, and parameters (dynamic input or descriptor entity) using techniques such as natural language processing (NLP). The query layer 110 may access the knowledge graph 140 during the interpretation steps to understand enterprise ontology, relationship information, and descriptor entities stored on the knowledge graph 140. Each of the identified entities from the interpretation of the received query are then mapped to a task to create a query plan for executing the tasks.

The execution layer 120 is comprised of software, hardware, APIs, and/or circuitry for implementing the attributed features of the execution layer 120 described herein. The execution layer 120 is configured to execute the tasks included in the query plan created by the query layer 110. The execution layer 120 schedules each query task to available execution resources for concurrent and parallel execution.

For example, the execution layer 120 executes a query execution tool that enriches and expands query tasks at runtime with physical schema information from the knowledge graph 140. The query execution tool processes data via graph traversal, where each edge and vertex is processed agnostically, independent of where its corresponding data is originally stored. The query execution tool fetches schema information by consuming the information stored in the knowledge graph dynamically. The query execution tool then relies on the abstraction layer 130 to fetch data based on schema information. The query layer 110 resolves concepts to storage locations and dynamically queries data from storage systems at task compute time, in order to retrieve needed information and prevent bulk data retrieval for faster query performance.

The abstraction layer 130 is comprised of software, hardware, APIs, and/or circuitry for implementing the attributed features of the abstraction layer 130 described herein. The abstraction layer 130 is configured to decouple application logic from underlying schema knowledge, shields applications from schema changes, and enables application modularity. In this way, the data virtualization features of the abstraction layer 130 accesses information from the knowledge graph 140 in response to the received query, and returns back results to the enterprise unit submitting the query without the enterprise unit having to ingest or duplicate data it would otherwise would have been required to.

The application API 137 is a data provider. Data may be at rest in a database, or data may be be available upon request via an API. For example, a financial service company having stored their customer information in a database, may initiate an API call to a data provider for The London Interbank Offered Rate in order to provide a loan product. It follows that communication between the KGVS 100 executing the data virtualization of the knowledge graph 140 and the enterprise unit submitting the query, may be provided through the application API 137. The abstraction layer 130 may further retrieve data through the third set of DB connector 133 from the DB/Search engine 136, and/or access one or more different data source databases 135 through the second set of DB connectors 132.

The abstraction layer 130 may be applied to a heterogeneous environment of various data storage solutions (e.g., tables, document collections, column family, key-value stores, object stores, or other data storage platforms), different application interfaces (e.g., RESTful API, SOAP API, GraphQL, Thrift Protocol, RPC, OpenMPI, or other application interface), and other information retrieval systems (e.g., search engines and external databases). The abstraction layer 130 materializes query tasks (in abstract form) that are received, into queries that are executable by specific data storage systems.

The KGVS 100 references the knowledge graph 140 which includes domain concepts, schema elements, and mappings between schema elements to domain concepts. This knowledge graph 140 is used to augment and accelerate the data mapping process when the underlying schema is changed. Additionally, the knowledge graph 140 is used to recommend a schema mapping when new available data sources are added to the KGVS 100. The recommendation is processed probabilistically through inferencing and abduction on generated data profiles of schema elements. The knowledge graph 140 maintains translational relationships, including both technical data translation and linguistic translation. A technical data translation represents how a piece of data can be transformed to another piece of data, and this feature is particularly useful for linking data from different data sources (e.g., different data collections). A linguistic translation represents how an entity can be expressed in other forms, either in the same language (synonym) or in a different language (e.g., "Hello" in English is understood to be equivalent to "Hola" in Spanish). This linguistic relationship is helpful for merging data, due to language difference or expression variation.

The KGVS 100 implements data security enforcement mechanisms by applying data access rules during schema the reasoning step, and obfuscation rules during data processing and presentation. The security mechanism prevents malicious attempts to access restricted data or reverse engineer any mechanisms in an attempt to infer schema information from query results. The KGVS 100 enforces data accessing rules at the schema level when planning query. No information is returned if the query is not possible, preventing user from inferring data schema. The KGVS 100 does not create a duplicate copy of data, and instead relies on the data source system for authentication and authorization when data is accessed.

Describing the knowledge graph 140 attributes in more detail, the knowledge graph 140 is constructed to include the underlying data schema (e.g., physical storage address, storage mechanism, storage version, data collection and their relationships). The knowledge graph 140 further includes data profiles and statistics of the underlying data storage. This information may be referenced for query task optimization.

The knowledge graph 140 further includes semantic business concepts (e.g., Customer has many accounts, Customer has Balance, Balance is an aggregation of account balances). The knowledge graph 140 further includes descriptor entities and their materialization to facilitate query reasoning. A descriptor entity is a collection of multiple representations that map to the same real-world entity, such as the State of California. A descriptor entity can have one or multiple connections to schema elements, describing how the descriptor entity is stored in the target data store.

The knowledge graph 140 further includes data access rules on a semantic layer. Exemplary data access rules may include a rule where a data access transaction analyst cannot see a customer address, an auditor can see customer address, and an account balance has to be masked into tiers.

Figure 4:
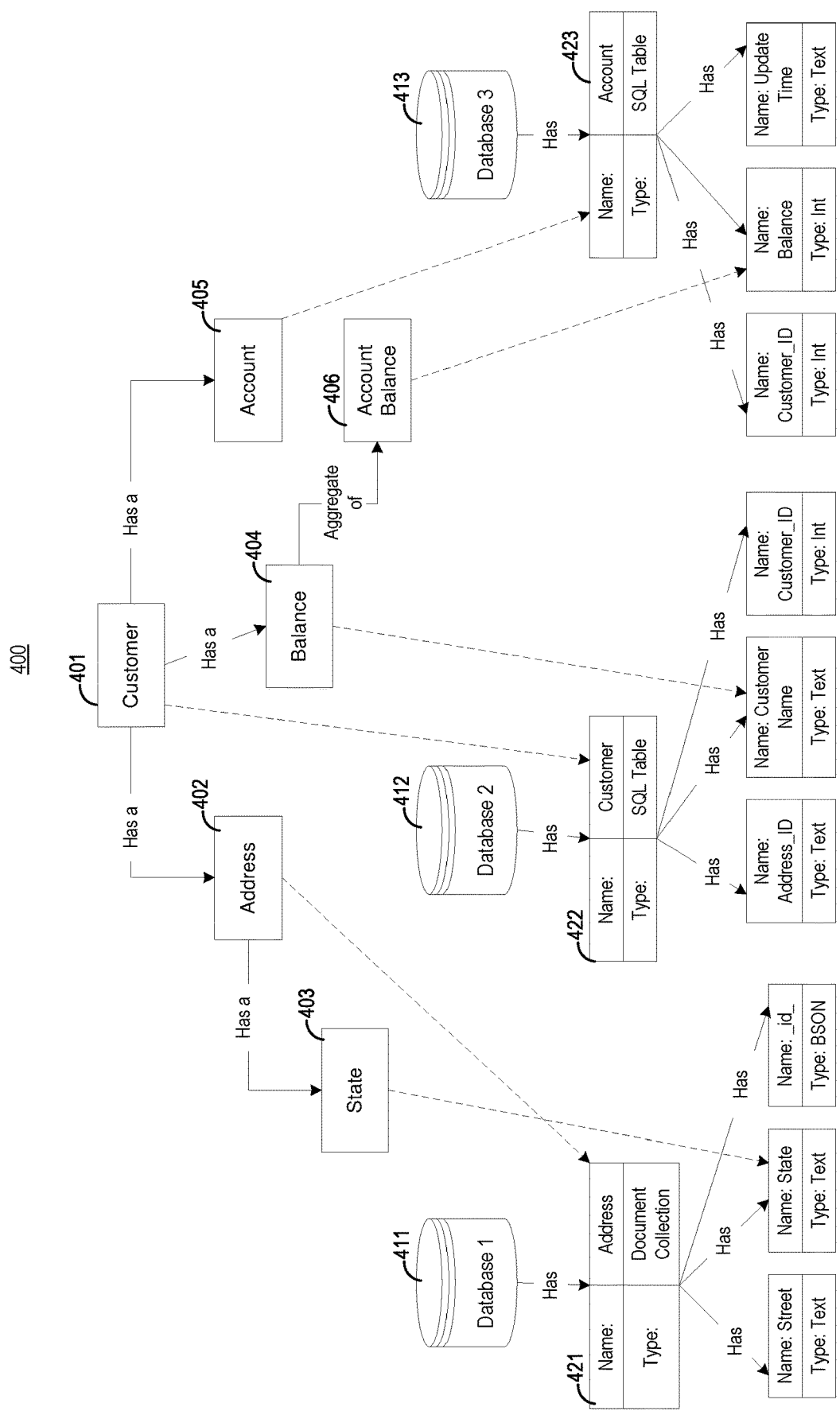
FIG. 4 shows an exemplary concept graph utilized by the knowledge graph virtualization system.

An exemplary concept graph 400 showing a representation of the knowledge graph 140, is shown in FIG. 4. The concept graph 400 may be referenced by the KGVS 100 when analyzing the exemplary query referenced in this disclosure ("Show me customers from state of California with balance greater than $20,000"). In the concept graph 400, three data tables (data table 421, data table 422, and data table 423) are obtained from three respective databases (first database 411, second database 412, and third database 413). The concept graph 400 stores multiple business concepts (e.g., "Customer" 401, "Address" 402, "State" 403, "Balance" 404, "Account" 405, and "Account Balance" 406), their relationships, and a concept-to-schema mapping, as represented by the dotted lines. Each concept is presented in its canonical form in the concept graph 400 shown in FIG. 4.

The knowledge graph 140 may store other various representations of the same concept (synonym or in another language). In addition to the concepts and representations included in the concept graph 400, the knowledge graph 140 may store data schemas and related metadata from data profiling. When a new data source is added, or an existing data source is updated, the knowledge graph 140 compares and match against stored information to generate mapping recommendations with a confidence score via recommendation algorithms (e.g., PageRank, or other recommendation algorithm). A user input to the enterprise application may be used as the ground truth that overrides system recommendations. User inputs are stored and used in conjunction with data to generate future recommendations.

Figure 2:
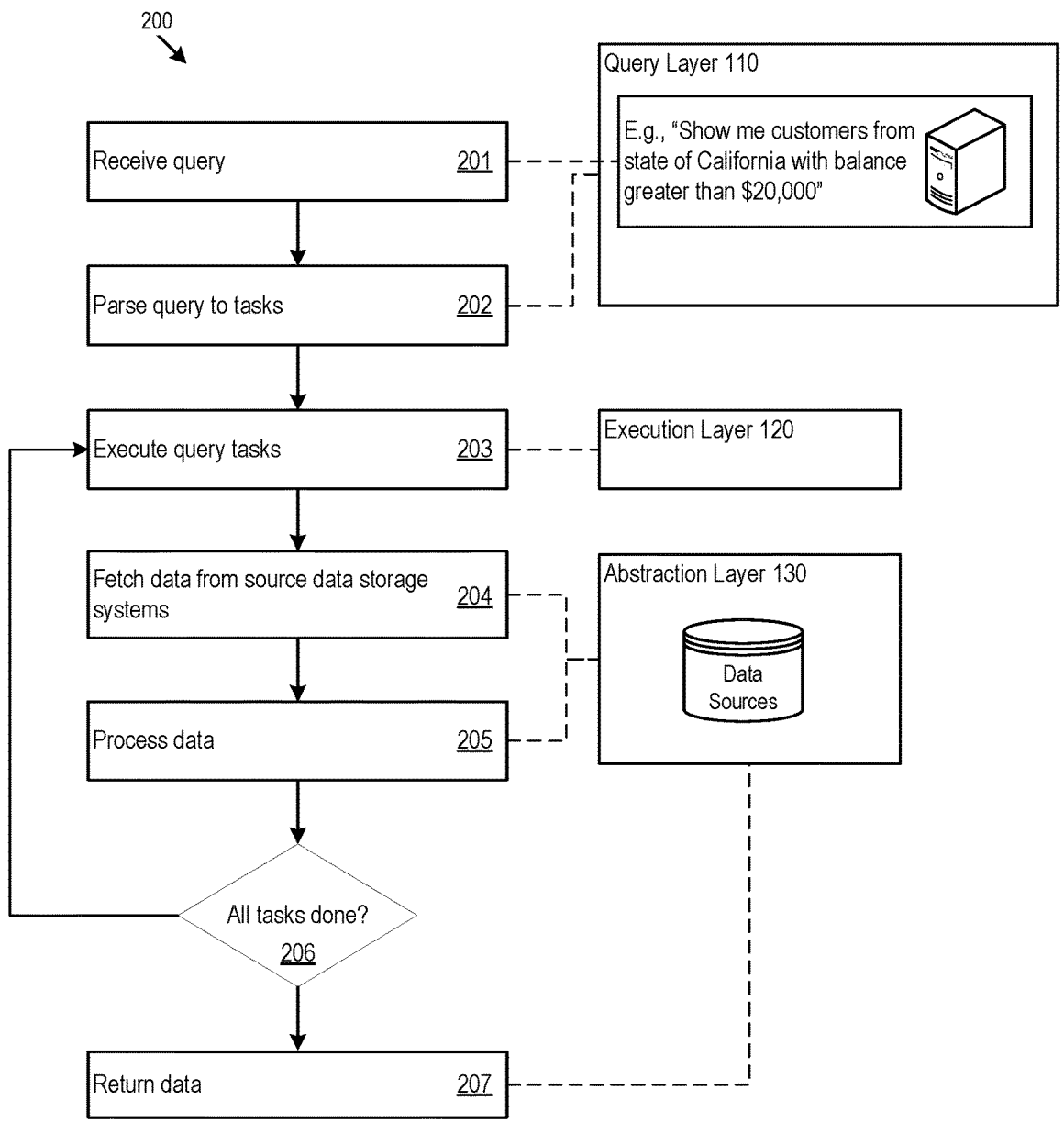
FIG. 2 shows an exemplary flow diagram of logic describing a process implemented by the knowledge graph virtualization system.

FIG. 2 shows an exemplary flow diagram 200 of logic describing a process implemented by the KGVS 100. Description of the flow diagram 200 will be provided with reference to the detailed system diagram of the KGVS 100 shown in FIG. 3 and the concept graph 400 shown in FIG. 4.

The KGVS 100 initially receives a query from an enterprise application (201). The exemplary query referenced throughout this disclosure is the following: "Show me customers from state of California with balance greater than $20,000". The query is received by the query layer 110, where the query layer 110 is executing a query interpretation tool to implement features described as being attributed to the query layer 110. Within the detailed system diagram of the KGVS 100 shown in FIG. 3, the query is shown to be received by the driver 112 included in the query layer 110.

After receiving the query, the query interpretation tool operates to parse the query into individual tasks for execution (202). The query interpretation tool begins by extracting schema elements, relationships, processing logic, and parameters (dynamic input or descriptor entity) using techniques such as natural language processing. Thus, upon processing the received query, the resulting candidate entities includes: "CUSTOMER", "STATE", "BALANCE", "GREATER THAN", "California" and "20,000". The candidate entities are then sent by the query interpretation tool to a planner 113, where the planner will use the candidate entities to construct a proper query plan.

From the planner 113, the query interpretation tool enriches the candidate entities by obtaining business ontology, relationship information, descriptor entities, and/or other metadata stored on the knowledge graph 140. The enrichment information/data is obtained from a meta store 125 that stores physical schema information 126 and semantic schema information 127. The enrichment information/data may also be obtained from an entity store/indexer 128 included in the knowledge graph 140.

After enriching the candidate entities are then classified accordingly by the query interpretation tool. For example, the "CUSTOMER", "STATE", and "BALANCE" entities are recognized as being classified as Schema Elements by the query interpretation tool. The query interpretation tool also recognizes "California" as being classified as a Descriptor Entity, and "20,000" as being classified as a Dynamic Input.

Following the query parsing, enriching, and classification, the query interpretation tool controls the planner 113 to translate the query into sub-query tasks and arrange a tree representation of the tasks to create a query plan. The query plan may be constructed in the data format of a direct acyclic graph. Exemplary sub-query tasks, as expressed in a triplet format, are provided below:

<Traversal Element><relationship><Traversal Element>
<Traversal Element><processing logic><Parameter>
<Parameter><processing logic><Parameter>

Where a traversal element is either an entity in a concept graph, or the result of a sub query task, and a parameter is either a dynamic input, or a descriptor entity.

The query may be parsed into four unique sub-tasks as follows:

Customer from State—Task 1
State=California—Task 2
Customer with Balance—Task 3
Balance Greater than 20,000—Task 4

While creating the query plan, the query interpretation tool optimizes the flow feeding into the query plan without breaking task interdependency. The goal of optimization is to execute certain tasks as early as possible to reduce the size of the intermediate result during join operations, relying on the data profile stored in the knowledge graph 140. With regards to the example query, one sensible way to arrange the query execution order is Task 1, Task 2, Task 3, Task 4. However, arranging the order as Task 3, Task 4, Task 1, Task 2 would also work. The optimal query plan depends on which filter, "State=CA" or "Balance>20K", can produce a smaller intermediary result set for "Customer".

The query interpretation tool then transmits the query plan from the planner 113, back to the driver 112. The driver 112 then transmits the query plan to the execution engine 111 to initiate execution of the tasks included in the query plan.

The driver 112 further provides security features, where during this query planning session, data access control is enforced by the knowledge graph 140 returning concepts which are only visible to an end user to help reason the query. This prevents malicious activities, such as reverse engineering, by inferring hidden concepts used in traversal.

Referring back to flow diagram 200, the KGVS 100 initiates execution of the query tasks included in the query plan (203). The execution of the query tasks included in the query plan is implemented by an execution tool running on the execution layer 120.

The execution tool takes in the query plan as input, analyzes the query plan for optimization, and schedules it for execution. If query tasks refer to the same data source, the execution tool analyzes whether it is possible to merge multiple data fetching tasks to the same database in a batching format. If certain filter logic is to be performed on some property, the execution tool analyzes whether it is possible to perform query push down (i.e., apply filtering logic when fetching original data source to reduce intermediary result size).

The execution tool operates the query scheduler 121 to schedule the query task to be processed using available traversal workers 122. If there are additional computing resources available, additional traversal workers 122 are launched by the execution tool as needed.

Traversal workers 122 execute the leaf tasks in the query plan. If the query task requires additional data, the traversal worker gets schema information from the knowledge graph 140 using the concept graph-to-schema graph mappings. Assuming execution order of Task 1, Task 2, Task 3, Task 4 in the example query, Task 1 would require selection of "Customer" and "Address".

The traversal workers 122 may further retrieve entity information from the knowledge graph 140. For example, the following entity information may be retrieved from the knowledge graph 140, as illustrated in the concept graph 400:

Customer on Second database 412: CustomerID, CustomerName, Address_ID
Address on first database: _ID_, State, Street
Address_ID→TextToBSON→_ID_

The traversal workers 122 send the data fetching request to the query executor 123, where the query executor 123 pushes the query to the underlying storage systems mechanisms. In the example query, this will break down into the following steps (assuming First Database 411 is MongoDB, Second Database 412 is a generic MySQL Server).

DB1→(Collection Address, Filter*, Fields [_ID_, State])
DB2→(Collection Customers, Filter*, Fields [CustomerID, CustomerName, Address_ID])

Referring back to flow diagram 200, the KGVS 100 fetches data from source data storage systems (204). The data fetching is implemented by an abstraction tool running on the abstraction layer 130.

The abstraction tool controls the query executor 123 to communicate through a DB connector (e.g., DB connectors 131, DB connectors 132, DB connector 133, DB connectors 134) based on source data system types and connection information. The abstraction tool then controls the query executor 123 to send the abstract query to the associated DB connector (either synchronous or asynchronous). For example, the database type receiving Task 1 from the exemplary query as shown in the concept graph 400 is a MongoDB type of database, and the corresponding DB connector is a MongoDB type of DB connector.

A DB connector first compiles a generic query expression as an executable query string based on the type of the associated source data system and query language dialect of the source data system. In the example, the DB connector corresponding to the MongoDB compiles the query to be "db.addresses.find(", {_ID_:1, State:1})".

Figure 3:
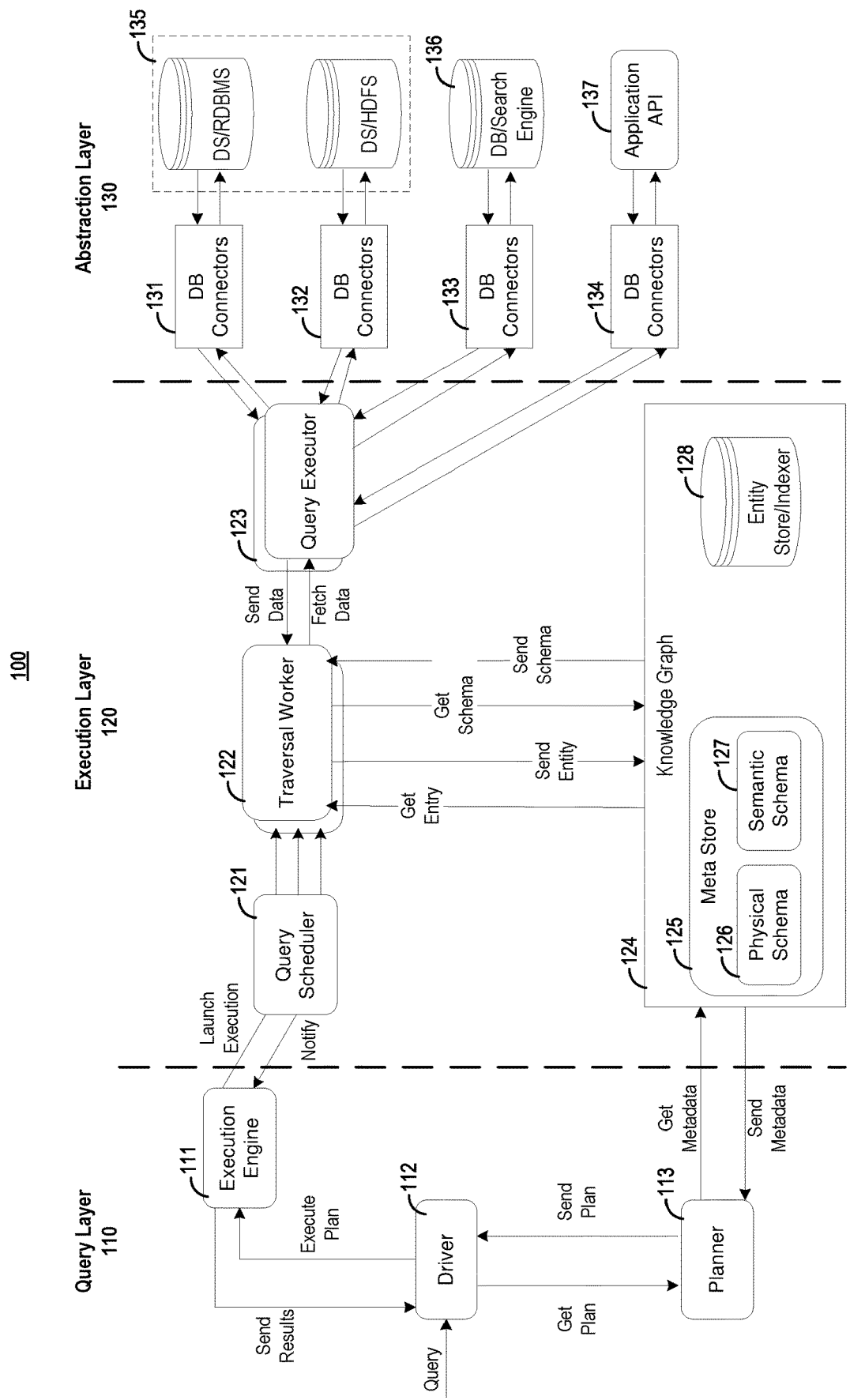
FIG. 3 shows an exemplary detailed system diagram of the knowledge graph virtualization system.

The DB connector 131 sends the query to the underlying data storage mechanism for data retrieval. In FIG. 3, the data source database 135 is shown to include at least a data source/relational database management system (DS/RDBMS) and a data source hadoop distributed file system (DS/HDFS).

The data source system (e.g., DB/Search Engine 136) returns the query result back to the corresponding DB connector 133. For the exemplary query represented by the concept graph 400, the MongoDB returns a collection of documents in array format [{_id_: "1234", "CA"}, {_id_: "1235", "NJ"} . . . ].

The DB connector 133 normalizes and converts the structure to an intermediary representation format that is supported by the query processing mechanism. In the exemplary query represented by the concept graph 400, MongoDB objects are converted to a collection of supported Key-Value map objects. Other cases include converting "short" integer to regular integer.

The DB connector 133 returns the processed data to the query executor 123. The query executor 123 then returns the data to the traversal workers 122 for query processing.

Referring back to flow diagram 200, the traversal workers 122 traverse and process the returned data (205). In terms of the exemplary query, Task 1, the traversal workers 122 join two different data sets from the source data in an intermediary representation that can be converted from a document store and a relational database. The join operation is performed by, for example, "Address_ID→TextToB- SON→_ID_". The end result is a collection of customer information with address and is made available for Task 2 to consume.

Referring back to flow diagram 200, after traversal workers 122 finishes a task, the query scheduler 121 checks whether there exists any query tasks in the query plan that are still executable, given the new sub task result of the finished task (206). If there are tasks dependent on the result of the finished task, the KGVS 100 will further execute the dependent query tasks by reverting back to step (203). If there are no outstanding query tasks, the query scheduler 121 marks the query plan as "complete" and notifies the driver 112 with the availability of a query result. In terms of the exemplary query, the query scheduler 121 launches Task 2 after Task 1 and so on until each task is executed and completed in the query plan. After Task 5 is finished, there are no additional tasks to be performed.

As a final step, the driver 112 returns the query result to the enterprise application having input the query (207).

Figure 5:
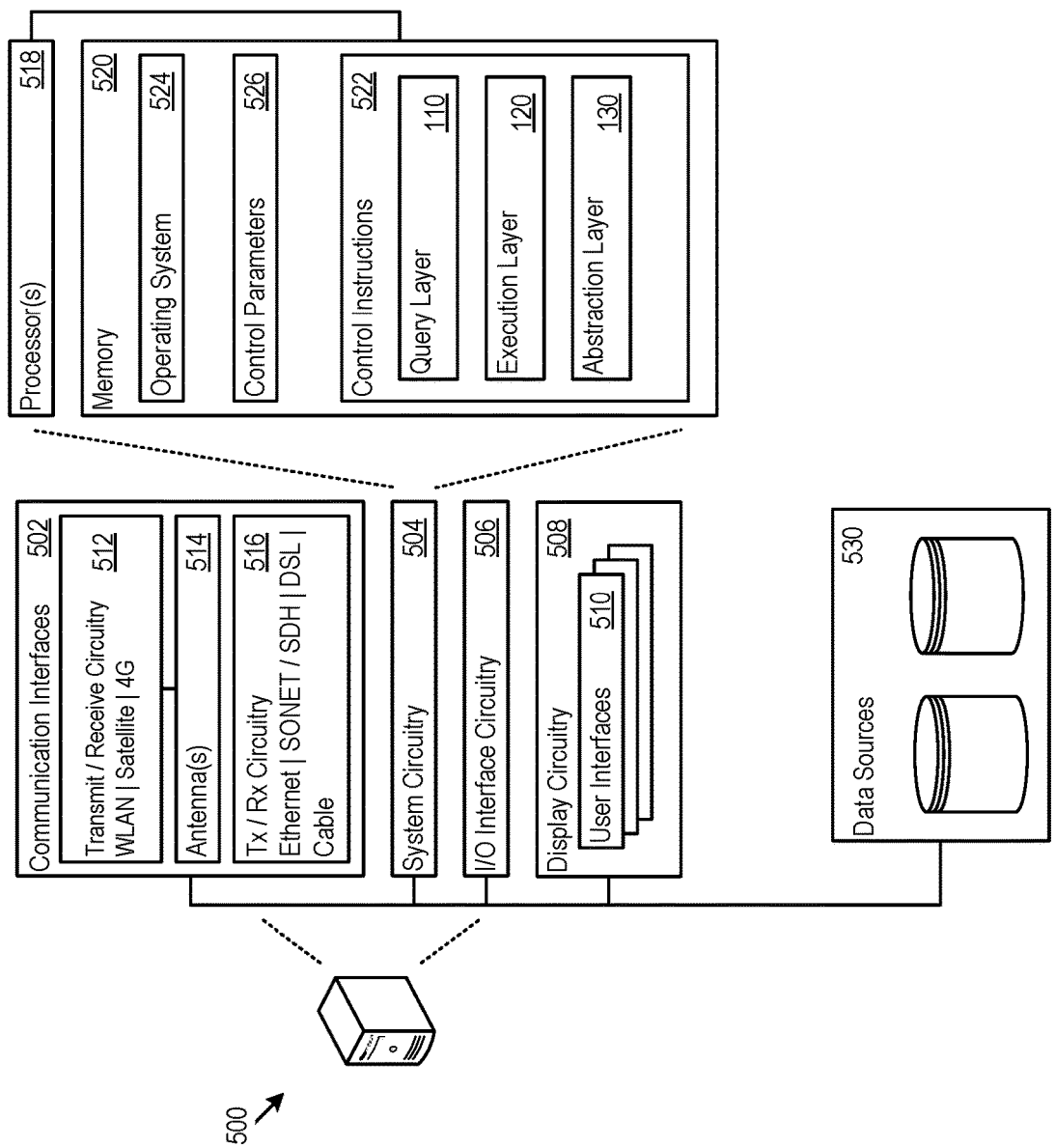
FIG. 5 shows an exemplary computer architecture for a computer device.

FIG. 5 illustrates an exemplary computer architecture of a computer device 500 on which the features of the KGVS 100 may be executed. The computer device 500 includes communication interfaces 502, system circuitry 504, input/output (I/O) interface circuitry 506, and display circuitry 508. The graphical user interfaces (GUIs) 510 displayed by the display circuitry 508 may be representative of GUIs generated by the KGVS 100 to present the query results to the enterprise application or end user having input the query. The GUIs 510 may be displayed locally using the display circuitry 508, or for remote visualization, e.g., as HTML, JavaScript, audio, and video output for a web browser running on a local or remote machine. Among other interface features, the GUIs 510 may further render displays of the constructed knowledge graphs.

The GUIs 510 and the I/O interface circuitry 506 may include touch sensitive displays, voice or facial recognition inputs, buttons, switches, speakers and other user interface elements. Additional examples of the I/O interface circuitry 506 includes microphones, video and still image cameras, headset and microphone input/output jacks, Universal Serial Bus (USB) connectors, memory card slots, and other types of inputs. The I/O interface circuitry 606 may further include magnetic or optical media interfaces (e.g., a CDROM or DVD drive), serial and parallel bus interfaces, and keyboard and mouse interfaces.

The communication interfaces 502 may include wireless transmitters and receivers ("transceivers") 512 and any antennas 514 used by the transmit and receive circuitry of the transceivers 512. The transceivers 512 and antennas 514 may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 502 may also include serial interfaces, such as universal serial bus (USB), serial ATA, IEEE 1394, lighting port, $I^2C$, slim Bus, or other serial interfaces. The communication interfaces 502 may also include wireline transceivers 516 to support wired communication protocols. The wireline transceivers 516 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 504 may include any combination of hardware, software, firmware, or other circuitry. The system circuitry 504 may be implemented, for example, with one or more systems on a chip (SoC), application specific integrated circuits (ASIC), microprocessors, discrete analog and digital circuits, and other circuitry. The system circuitry 504 may implement any desired functionality of the KGVS 100. As just one example, the system circuitry 504 may include one or more instruction processor 618 and memory 520.

The memory 520 stores, for example, control instructions 522 for executing the features of the KGVS 100, as well as an operating system 524. In one implementation, the processor 518 executes the control instructions 522 and the operating system 524 to carry out any desired functionality for the KGVS 100, including those attributed to the query layer 110, the execution layer 120, or the abstraction layer 130. The control parameters 526 provide and specify configuration and operating options for the control instructions 522, operating system 524, and other functionality of the computer device 500.

The computer device 500 may further include various data sources 530. Each of the databases that are included in the data sources 530 may be accessed by the KGVS 100 to obtain data for consideration during any one or more of the processes described herein.

Various implementations have been specifically described. However, other implementations that include a fewer, or greater, number of features for each of the apparatuses, methods, or other embodiments described herein are also possible.

What is claimed is:

1. A system comprising:
   query circuitry configured to:
   receive a data query from a requesting application;
   access a knowledge graph, the knowledge graph including at least a first concept node corresponding to first concept information stored on a first data storage system, a second concept node corresponding to second concept information stored on a second data storage system, and a relationship edge relating the first concept node to the second concept node;
   enrich the data query at run time with knowledge information comprising physical schema information underlying schema elements and their relationship in the knowledge graph;
   parse the enriched data query into a plurality of sub-tasks in a triplet form;
   determine an optimized order of executing the sub-tasks to reduce a number of overall intermediary query results; and
   construct a query plan to include the plurality of sub-tasks in the optimized order;
   execution circuitry configured to:
   execute the sub-tasks included in the query plan in the optimized order; and
   return a query result based on the executed sub-tasks to the requesting application.

2. The system of claim 1, further comprising:
   abstraction circuitry configured to:
   fetch supplemental data from data storage systems including the first data storage system and the second data storage system;
   process the fetched supplemental data into the query result; and
   return the query result to the requesting application.

3. The system of claim 1, wherein the knowledge graph is constructed to represent a predetermined semantic concept.

4. The system of claim 1, wherein the query circuitry is further configured to:

extract, from the data query, distinct entities using natural language processing; and classify the distinct entities into at least one of a schema element, a descriptor entity, or a dynamic input.

5. The system of claim 1, wherein the execution circuitry is configured to determine the optimized order by arranging the sub-tasks in an order of producing a smaller intermediary result set to a larger intermediary result set.

6. The system of claim 1, further comprising abstraction circuitry, wherein the abstraction circuitry is further configured to:

access the first data storage system through a first database connector; and access the second data storage system through a second database connector.

7. The system of claim 1, wherein the execution circuitry is configured to execute at least two sub-tasks in parallel.

8. The system of claim 1, wherein the execution circuitry is configured to assign the sub-tasks included in the query plan to respective execution resources for execution.

9. A method comprising:

receiving, by a query circuitry, a data query from a requesting application;

accessing a knowledge graph, the knowledge graph including at least a first concept node corresponding to first concept information stored on a first data storage system, a second concept node corresponding to second concept information stored on a second data storage system, and a relationship edge relating the first concept node to the second concept node;

enriching, by the query circuitry, the data query at run time with knowledge information comprising physical schema information underlying schema elements and their relationship in the knowledge graph;

parsing, by the query circuitry, the enriched data query into a plurality of sub-tasks in a triplet form;

determining, by the query circuitry, an optimized order of executing the sub-tasks to reduce a number of overall intermediary query results;

constructing, by the query circuitry, a query plan to include the plurality of sub-tasks in the optimized order;

executing, by an execution circuitry, the sub-tasks included in the query plan in the optimized order; and returning, by the execution circuitry, a query result to the requesting application.

10. The method of claim 9, further comprising:

fetching, by abstraction circuitry, supplemental data from data storage systems including the first data storage system and the second data storage system;

processing, by the abstraction circuitry, the fetched supplemental data into the query result; and returning, by the abstraction circuitry, the query result to the requesting application.

11. The method of claim 9, wherein the knowledge graph is constructed to represent a predetermined semantic concept.

12. The method of claim 9, wherein further comprising:

extracting, from the data query, distinct entities using natural language processing; and classifying the distinct entities into at least one of a schema element, a descriptor entity, or a dynamic input.

13. The method of claim 9, wherein determining the optimized order comprises arranging the sub-tasks in an order of producing a smaller intermediary result set to a larger intermediary result set.

14. The method of claim 9, further comprising:

accessing, by abstraction circuitry, the first data storage system through a first database connector; and accessing, by the abstraction circuitry, the second data storage system through a second database connector.

15. The method of claim 9, wherein executing, by an execution circuitry, the sub-tasks included in the query plan in the optimized order comprises executing at least two sub-tasks in parallel.

16. The method of claim 9, further comprising:

assigning the sub-tasks included in the query plan to respective execution resources for execution.

17. A system comprising:

a machine-readable medium, other than a transitory signal; and instructions stored on the machine-readable medium that, when executed by processing circuitry, cause processing circuitry to:

receive a data query from a requesting application;

access a knowledge graph, the knowledge graph including at least a first concept node corresponding to first concept information stored on a first data storage system, a second concept node corresponding to second concept information stored on a second data storage system, and a relationship edge relating the first concept node to the second concept node;

enrich the data query at run time with knowledge information comprising physical schema information underlying schema elements and their relationship in the knowledge graph;

parse the enriched data query into a plurality of sub-tasks in a triplet form;

determine an optimized order of executing the sub-tasks to reduce a number of overall intermediary query results;

construct a query plan to include the plurality of sub-tasks in the optimized order;

execute the sub-tasks included in the query plan in the optimized order; and return a query result based on the executed sub-tasks to the requesting application.

18. The system of claim 17, wherein the instructions, when executed by the processing circuitry, further cause the processing circuitry to:

fetch supplemental data from data storage systems including the first data storage system and the second data storage system;

process the fetched supplemental data into the query result; and return the query result to the requesting application.

19. The system of claim 17, wherein the instructions, when executed by the processing circuitry, further cause the processing circuitry to:

execute at least two sub-tasks in parallel.

20. The system of claim 17, wherein the instructions, when executed by the processing circuitry, further cause the processing circuitry to:

assign the sub-tasks included in the query plan to respective execution resources for execution.

* * * * *